United States Patent [19]
Lindblom

[11] 3,831,969

[45] Aug. 27, 1974

[54] SYSTEM FOR REGULATING THE HEIGHT OF THE BODY OF A VEHICLE ABOVE THE GROUND AND FOR INCLINING THE VEHICLE LATERALLY RELATIVE TO THE VEHICLE SUPPORTING MEANS

[76] Inventor: K. Julius Lindblom, Manhemsvagen 11A, 191 45, Sollentuna, Sweden

[22] Filed: Sept. 7, 1972

[21] Appl. No.: 287,049

Related U.S. Application Data
[63] Continuation-in-part of Ser. No. 104,674, Jan. 7, 1971, abandoned.

[52] U.S. Cl............................ 280/124 F, 280/6 H
[51] Int. Cl............................................. B60g 17/04
[58] Field of Search ............... 280/6 R, 6 H, 124 F; 180/118

[56] References Cited
UNITED STATES PATENTS
| | | | |
|---|---|---|---|
| 2,684,254 | 7/1954 | Goss | 280/6 H |
| 3,285,623 | 11/1966 | Van Winsen | 280/6 R |
| 3,374,848 | 3/1968 | Castelet | 280/6 R |

*Primary Examiner*—Philip Goodman
*Attorney, Agent, or Firm*—Oldham & Oldham Co.

[57] ABSTRACT

A system or apparatus for regulating the height of a vehicle body relative to the ground and for tilting said body laterally in relation to its supporting means including a laterally movable weight which deviates from a desired attitude as a result of the forces acting therein. The weight actuates a distribution valve when moved from its neutral position to distribute pressure medium, responsive to the movement of the weight, to piston-cylinder means adapted to regulate the height of at least one side of the vehicle body in relation to the vehicle body support means. A height regulating valve actuated by means which sense the mean height of the vehicle above the vehicle supporting surface and which supplies pressure medium to piston-cylinders arrangement to effect lifting or lowering of said vehicle body also is provided.

14 Claims, 5 Drawing Figures

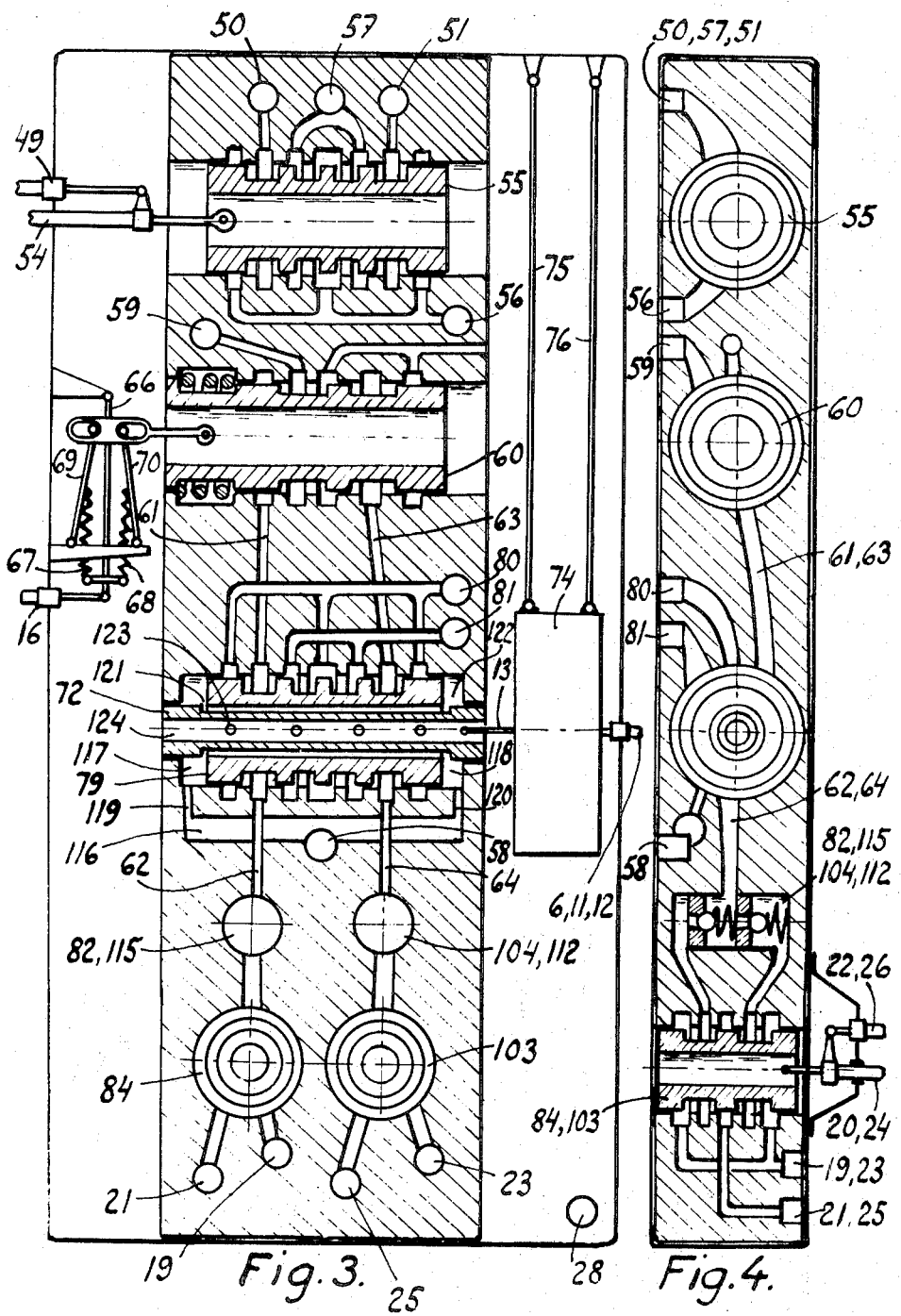

SYSTEM FOR REGULATING THE HEIGHT OF THE BODY OF A VEHICLE ABOVE THE GROUND AND FOR INCLINING THE VEHICLE LATERALLY RELATIVE TO THE VEHICLE SUPPORTING MEANS

This is a continuation-in-part of my prior application Ser. No. 104,674 filed Jan. 7, 1971 now abandoned.

The present invention relates to a system for regulating the height of a vehicle body above the ground and for inclining the vehicle body laterally in relation to the vehicle supporting means, such as the wheels of a wheeled vehicle, in response to gravitational forces and inertia forces acting on the vehicle.

In the case of certain types of vehicles, especially land vehicles, it is essential to the comfort of persons travelling therein that the lateral accelerations to which they are subjected are maintained at an acceptable low level, for example when travelling through bends, and that the vehicle when moving along a straight path or when stationary adopts a substantially horizontal attitude. This problem has been solved to a certain extent on roads and railway lines by banking or superelevating the bends occurring therein. For practical reasons, however, such bends can only be banked to within certain limits, which means that a bend of specific radius must be laid for a specific vehicle speed. With the increasing desire for higher speeds, this solution calls for curve radii of impracticable magnitudes and cannot therefore be considered a satisfactory answer to the problem. Moreover, a banked or superelevated foundation has the disadvantage whereby laterally acting forces occur if, for some reason, the vehicle is moved slowly through a curve or is stationary therein.

It is also desirable to maintain the vehicle at a determined level above the ground, to facilitate loading and unloading, for example, and that the vehicle body can be raised and lowered so as to enable it to be adjusted to different loading and unloading devices at different locations.

Attempts have been made to solve the aforementioned problem by means of devices and systems which tilt the vehicle during its passage through a curve, but these devices and systems have not satisfactorily solved the problem and, moreover, are very complicated and thus expensive and sensitive to interference or disturbances of different kinds.

The object of the present invention is therefore to provide a system of the aforementioned type which is relatively simple in design and operation and insensitive to interference and disturbance, and which operates satisfactorily under all operating conditions. This object is obtained by means of the present invention, which is mainly characterized by a laterally movable weight supported by the vehicle body and arranged to take a neutral position in said body when the body is in the desired attitude and to move from said neutral position when the attitude of said body deviates from the desired attitude as a result of the forces acting thereon, and which weight is arranged to actuate a distribution valve when moved from its neutral position so as to distribute pressure medium, responsive to the movement of the weight, to piston-cylinder means adapted to regulate the height of at least one side of the vehicle body in relation to the vehicle body support means, the system also including a height regulating valve which is arranged to be actuated by means which sense the mean height of the vehicle above the vehicle supporting surface and which supplies pressure medium to piston-cylinder arrangement to effect lifting or lowering of said vehicle body.

The invention will now be described in detail with reference to the accompanying drawing, in which FIG. 1 illustrates diagrammatically a system according to the invention in which a pulse converting unit is fed with different pulses and converts and amplifies output signals for different purposes;

FIG. 3 illustrates a practical embodiment of the converting unit;

FIG. 4 is a side view of the converter shown in FIG. 3; and

Figure 1:
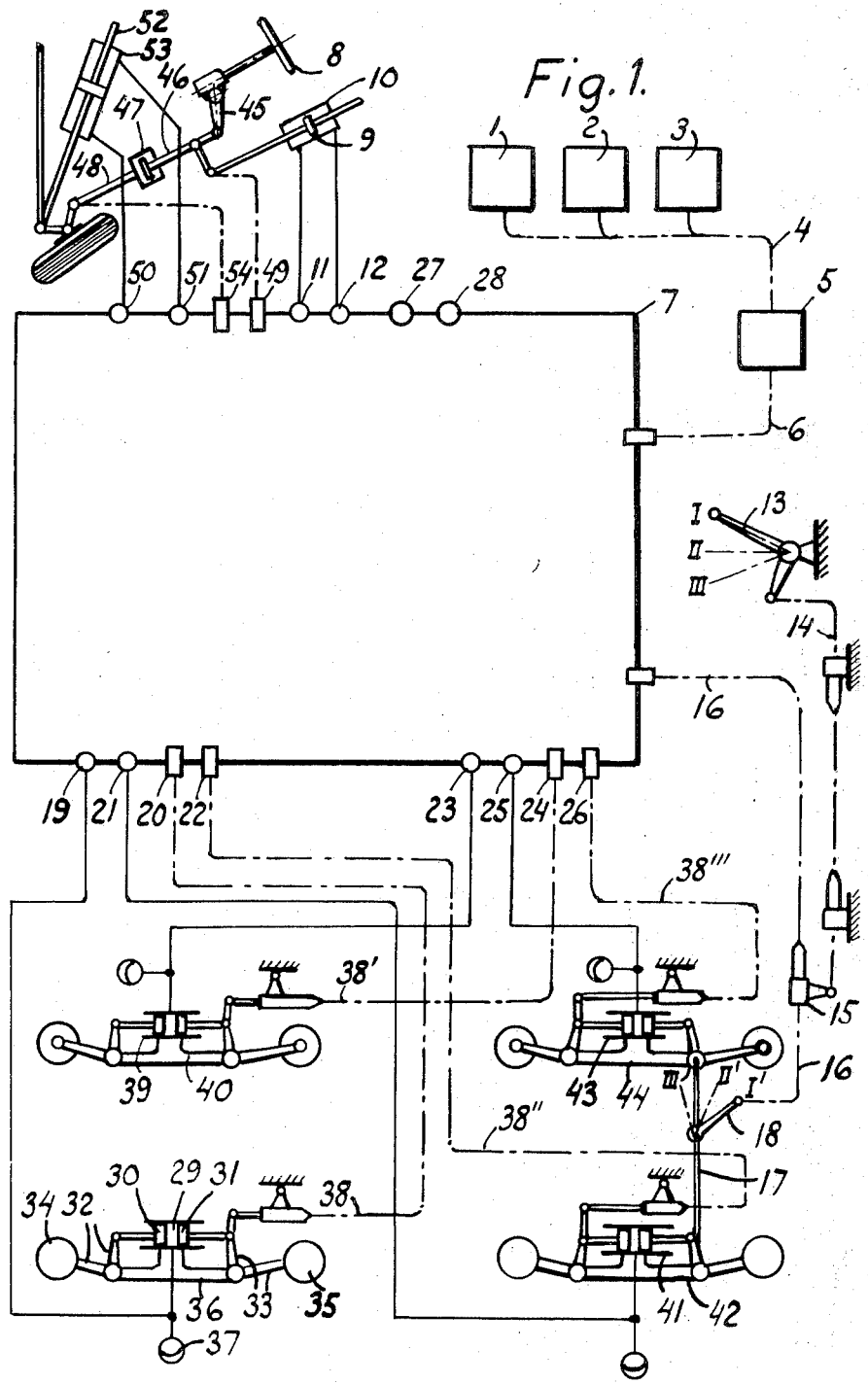

In FIG. 1, the reference numeral 1 indicates a means for sensing the speed at which a vehicle is moving, the vehicle speed sensing device, the numeral 2 a means for sensing the radius of the curve through which the vehicle is moving, the curve radius sensing means (straight movement paths corresponding to curves of infine radius) and the numeral 3 a means for determining the extent to which the curve through which the vehicle is moving has been banked, the curve banking sensing means. The sensing means 1, 2 and 3 may be of any known type. The sensing means 1 is preferably a tachometer generator of the type used in some kinds of speedometers, etc., and giving an electric potential that is proportional to the speed. Sensing means 2 may include an arm attached to the bogie or wheel system and actuating a rheostat or the like fixed to the vehicle, so that a turning of the bogie or the wheel system varies the resistance in an electrical circuit in proportion to the angle of turning between the vehicle and the bogie. The sensing an 3 may include a gyroscope creating n artificial horizon and a device similar to the sensing means 2 sensitive to the angle between the artificial horizon and the wheel axle of the vehicle. The signals transmitted from the sensing means 1, 2 and 3 are passed via a line 4 to a collecting means, for example an electronic counter 5, which in turn transmits the signals via a line 6 to a converting and amplifying means 7, which will be described hereinafter. The electrical impulses from the sensing means 1, 2 and 3 are summed up in the counter 5 and the resultant impulse may actuate a solenoid (not shown) which in turn actuates the line 6. The line 6 may consist of a Bowden-cable or Flex-ball-cable or the like. The other end of the cable 6 actuates the weight 74, or if electrical signals are transmitted by line 6 a solenoid, connecting operatively to the weight 74, may be actuated by such signal to move the weight. In the case of rapid changes in the direction of movement of the vehicle, for example, when the vehicle enters or leaves a curve at high speed, signals can be transmitted in response to movement of the bogie or of the steering wheel 8. In such instances, expediting pressure medium pulses are transmitted through lines 11 and 12 to the amplifying means 7 by means of a non-sealing piston 9 in a cylinder 10, the piston 9 having a diameter smaller than the inside diameter of the cylinder 10. In the exemplary embodiment, three different height positions of the vehicle body relative to the vehicle supporting surface can be selected manually by means of a lever 13, these positions being indicated in FIG. 1 by I, II and III, which represent positions of maximum height, intermediate height and minimum height, respectively. Extending from the lever 13 is a control cable 14 which is secured to an attachment means 15 movably arranged on a control cable 16, movement of the lever 13 causing the attachment means 15 to move along the control cable 16. The cable 16 is secured at one end to an arm 18 mounted in the center of a torsion bar 17 arranged between the system of vehicle wheels on one side of the vehicle and a corresponding system of vehicle wheels on the other, the arm 18 registering the average height of the vehicle body above the ground at any given moment. The free end of the cable 16 is attached to a valve actuator means 65 (FIG. 2) located in the signal amplifying and converting means 7 and arranged to alter the setting of a pressure medium valve 60 (FIG. 2), thereby to supply pressure medium to or drain pressure medium from the system of cylinders by which the vehicle body is raised or lowered relative to the vehicle supporting surface, as hereinafter described.

By moving the lever 13 between the different positions, the element 15, which is attached to the opposite end of the Bowden or Flex-ball cable 14, is moved. As the element 15 is in itself the end of the outer casing of the Bowden or Flex-ball cable 16, any movement of the element 15 means that one end of the cable 16 must move to a new position. The end attached to the lever 18 is fixed, and so the other end must move, which means that the valve 60 is actuated to raise or lower the vehicle.

As will be seen from the drawing, each system of vehicle wheels is provided with a piston-cylinder arrangement. In FIG. 1, these piston-cylinder arrangements, which are conceived to be mounted to the bogies of a vehicle for example, are identified by the reference numerals 29, 39 and 41, 43 and are supplied with pressure medium through lines 19, 21, 23 and 25, respectively, extending from the signal converting and amplifying means 7, while in FIG. 2 the cylinders are identified by the reference numerals 86, 109 and 95, 99.

In the exemplary embodiment of the piston-cylinder arrangements of FIG. 1, the cylinder 29 has two pistons 30 and 31, which are caused to move within the cylinder by pressure medium arriving through a line 19. Cooperating with the pistons 30 and 31 are two link systems 32 and 33 which coact with vehicle wheels 34 and 35 in a manner whereby, as pressure medium is supplied to the cylinder 29 and the pistons caused to move thereon, the links force the wheels 34, 35 against the surface on which they are supported, thereby lifting that side of the vehicle body to which the bogie is attached. Vehicle movements caused by the vehicle suspension can be accommodated by means of a gas-liquid spring means 37 in a known manner. The means for jacking respective side portions of the vehicle have been described with reference to the embodiment of FIG. 1 only with respect of one bogie, namely the bogie 36. The jacking system for remaining bogies 40, 42 and 44 is identical to that of bogie 36, each of the remaining cylinder systems 39, 41 and 43 having two working pistons cooperating with link systems which upon movement of the cylinders cause respective sides of the vehicle body to be raised accordingly. Extending from each piston-cylinder arrangement via the link system cooperating therewith is a control cable 38, 38', 38'', 38''', which are connected with pressure medium valves in the signal converting and amplifying means 7 via actuating devices 20, 24, 22 and 26 in that order.

As will be seen from FIG. 1, the arm 18 mounted on the torsion bar 17 is arranged to move between three positions, I', II' and III' which lie beyond the normal spring movements of the vehicle provided by the vehicle suspension system.

Thus, in the embodiment of FIG. 1, when the lever 13 is moved from the position I to position II, the attachment means 15 will move along the cable 16 without moving the arm 18. Instead, the cable 16 actuates the valve actuating means 65 (FIG. 2) in the signal converting and amplifying means 7 causing pressure medium to be drained from the system of cylinders of the vehicle, whereupon the vehicle body is lowered to the intermediate height corresponding to position II of the lever. The torsion thus created in the bar 17 will cause the arm 18 to move from position I' to position II', whereby a tension force is applied to the cable 16, which then actuates the valve actuating means 65 to stop drainage of the cylinder system of the vehicle. When lowering the vehicle body to the minimum height position III, the same sequence of events takes place, torsion on the bar 17 causing the arm 18 to move to position III' and in doing so, tensions the cable 16, thereby stopping the removal of pressure medium from the cylinders. When raising the vehicle body by manipulation of the lever 13, the cable 16 actuates the valve actuating means 65 in the opposite sense, whereby pressure fluid is supplied to the cylinders and the vehicle body raised in the aforedescribed manner.

Element 15 is one end of the casing of a Bowden or Flex-ball cable and is movable relative to the lever 18 to give different height settings.

The bar 17 is in no way connected to the suspension of the vehicle. It is only used as a sensing means for the lever 18. When the vehicle is raised or lowered, the lever 18 is turned, and this actuates the valve 60 via the cable 16, so that the height of the vehicle is restored to the set value. On the other hand, when the vehicle is tilted, the ends of the bar 17 are turned in opposite directions. The lever 18 is then not turned.

As previously mentioned, the arm 18 is arranged to be moved between three positions, in which it is not affected by the normal lifting and levering movements of the vehicle caused by its suspension. Consequently, the jacking and lowering system of the invention will not be effected by deviations from the set height of the vehicle body above the ground as a result of suspension movement. When such deviations are exceeded, however, the arm 18 is caused to move from its set position and the cylinders are either drained of pressure medium or filled until the arm 18 resettles within the limits of its set position. The element 16 does not move the arm 18.

In FIG. 1, the steering wheel 8 of the vehicle in which the system of the present invention is incorporated is provided with a steering arm 45 and a steering rod 46. The rod 46 is connected to a complementary rod 48 via a connecting means 47 with a certain clearance therebetween. The complementary steering rod 48 is in turn connected to the steering linkage system of the vehicle which cooperates with a piston-cylinder device 52–53. The piston-cylinder device 52–53 is connected with the signal converting and amplifying means 7 via lines 50 and 51, while the steering linkage system of the vehicle and the steering column 46 communicate with the signal converting and amplifying means 7 via cables 54 and 49, respectively. When the steering wheel 8 is turned, a signal is transmitted to the signal converting and amplifying means 7 through the cable 49, whereupon the means 7 responds with signals to the piston-cylinder device 52, 53 over lines 50 and 51. A signal informing that steering in response to the signal on lines 50 and 51 has been effected is transmitted to the signal converting and amplifying means via the cable 54.

Figure 2:
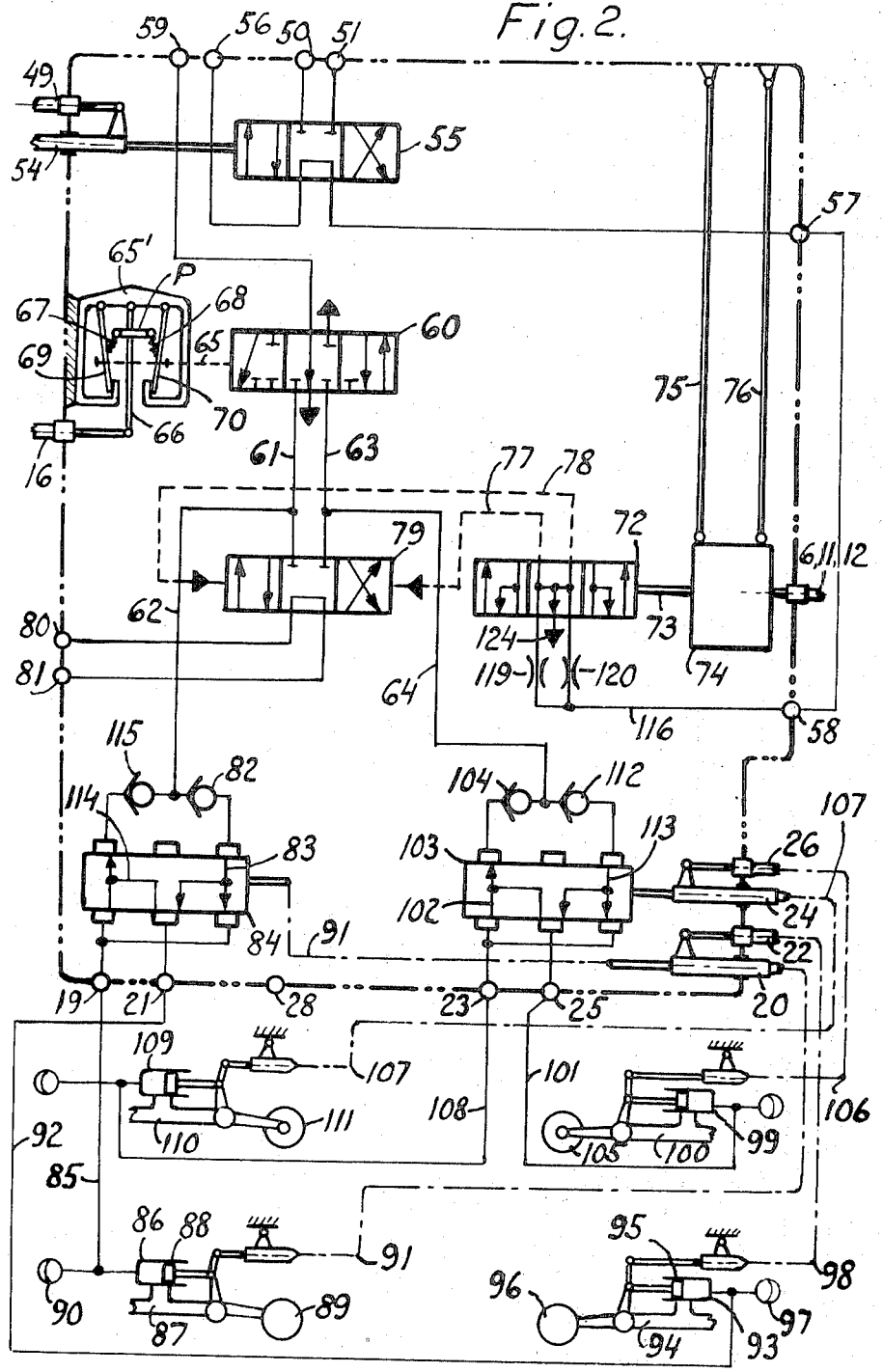
FIG. 2 illustrates diagrammatically the pulse converting unit used with the system of FIG. 1.

An example of the signal converting and amplifying means 7 of the present invention is illustrated diagrammatically in FIG. 2 and in side view and end view in FIGS. 3 and 4, respectively.

As will be seen from FIGS. 2–4, the control cables 49 and 54 are connected to a valve 55, which is served by the lines 50 and 51 which pass to the piston and cylinder device 52, 53. Pressure medium is supplied from a source not shown over a line 56 and in the exemplary embodiment can be transferred to other valves in the system via lines 57 and 58 for other purposes. Thus, when the valve 55 is actuated by the control cable 49 as the steering wheel 8 is turned, the valve outlets register with lines 50 and 51 causing pressure medium to be delivered to the piston-cylinder device 52, 53, whereupon the piston 52 is caused to move in the cylinder to alter the attitude of the vehicle wheel. The changed attitude of the wheel is registered in the valve by the control cable 54, causing communication, and thereby supply of pressure medium to the lines 50, 51 to be broken.

Connected to a pressure medium line 59 is a valve 60, which is actuated by the aforementioned valve actuating means 65. The valve actuating means 65 comprises a housing 65', in which are pivotally arranged three arms 66, 69 and 70. The arm 66 is positioned between the arms 69 and 70 and is connected with the control cable 16 cooperating with the attachment means 15 and the lever 13. In the exemplary embodiment of the valve actuating means 65, the arms 69 and 70 are biased by means of springs 67 and 68 attached to the arm 66 by means of a cross member P. When there is no applied tension on the cable 16, the arm 66 maintains the arms 69, 70 in the shown position by means of the springs 67 and 68. Should the cable 16 indicate that the height of the vehicle body above its supporting surface was too low, the arm 66 is moved by the cable 16 in a manner whereby the arm 70 is urged to the right as viewed in the drawing, thereby causing the valve body (not shown) in valve 60 to be moved in a similar direction. Movement of the valve body causes the passage of pressure medium to register with lines 61 and 62, which pass the pressure medium to respective cylinder systems to jack up corresponding sides of the vehicle body. Opposite movement of the control cable 16 will cause the valve body of the valve 60 to move in an opposite sense, thereby causing drainage lines 63 and 64 to register with pressure medium outlet lines communicating with the valve body, whereby pressure medium is drained from the cylinder system of the vehicle, causing the vehicle body to be lowered accordingly.

Also arranged in the signal converting and amplifying means 7 is a valve 72 which is actuated by means of a pin 73 controlled by a weight 74 which is conveniently suspended by straps or the like 75 and 76. The weight 74 can also be actuated by external impulses delivered through the line 6 associated with the electronic counter 5 and/or through the lines 11, 12 from the piston-cylinder device 9, 10 of the steering column. As will be evident from the drawing, movement of the weight 74 from its neutral position will cause the valve body (not shown) of valve 72 to move in a corresponding direction. Connected to the valve 72 by lines 77 and 78 is a further valve 79, whereby as the valve body of valve 72 is moved, pressure medium is caused to flow along lines 77 or 78, into the valve 79, causing corresponding movement of the valve body (not shown) of the valve 79.

If the vehicle body is to be raised in response to the signal acting on the valve 72, the valve body of the valve 79 will register with line 62 connected with pressure medium lines 61 and 62 over the valve 60. The pressure medium then flows through a single path valve 82 and an internal line 83 of a valve 84 arranged downstream of the valve 79. The pressure medium continues from the valve 84, through the line 19 and a line 85 to the cylinder system of one side 87 of the vehicle, the cylinder in the embodiment of FIG. 2 being identified by the reference numeral 86. The piston 88 of the cylinder 86 will force the wheel 89 down against its supporting surface via a system of links, as with the links 33 of FIG. 1, thereby causing this side of the vehicle to be lifted. Spring movements of the vehicle wheels are accommodated by a gas-liquid means 90. Extending between the link system of the wheel system 89 and the internal line 83 of the valve 84 via an actuating line 20 is a control cable 91 by means of which the internal line 83 is moved in the valve 84 as the vehicle side 87 is lifted by the pressure acting on the wheel system 89. As a result of the movement of the internal line 83, the supply of pressure medium to line 85 is throttled and the line 83 is caused to register with a line 92 which serves the cylinder 93 at the other end 94 of the vehicle. The pressure medium entering the cylinder 93 moves a piston 95 arranged therein, causing pressure to be exerted on the vehicle wheel system 96, whereupon the whole of the vehicle side 87, 94 is raised. A gas-liquid device 97 accommodates the spring movements of the wheel system 96.

Extending from the link system of the vehicle wheel system 96 is a control cable 98 which passes to an actuating device 22 cooperating with the actuating device 20 connected to the internal line 83 of the valve 84, movement of the vehicle side 94 causing corresponding movement in the control cable 98, whereby the internal line 83 is again moved by means of cable 91 to regulate the flow of pressure medium to the cylinders and to balance in this way lifting of this side of the vehicle irrespective of the load distribution thereon. Since the movement began with the cylinder 86, the load acting on this cylinder must be assumed to be greater at that instance than the load acting on the cylinder 93.

The other side of the vehicle 100, 110 is lowered in a corresponding manner. Pressure medium departs from the cylinder 99, which is subjected to the lighter load, on the vehicle side 100 over a line 101 and an internal line 102 of a valve 103 and continues over a single path valve 104 to a line 64 connected to a line 63 serving the valve 60. As a result of the pressure medium leaving the cylinder 99, pressure on the wheel system 105 is relieved and the vehicle side 100 lowered accordingly. A control cable 106 attached to the link system of the wheel system 105 when actuates on actuating device 26, which is connected via an actuating device 24 to the valve body (not shown) of the valve 103, causing communication of the internal line 102 with the line 101 to be broken and the internal line 102 to be registered with a line 108 passing to the cylinder system on vehicle side 110. Extending from the link system of the wheel system 111 is a control cable 107, which passes to the valve actuating device 24 cooperating with the valve actuating device 26 coacting with the cable 106. Movement of the vehicle side 110 will therefore actuate the valve 103 via the cable 107 and valve actuating device 24 to regulate the flow of pressure medium to the cylinder 109 accordingly. The vehicle side 100, 110 is lowered uniformly irrespective of the load distribution thereon. If the pressure medium is to be moved in response to the signals received by the means 7 of the invention, to the line 64, said medium passes over a single path valve 112, an internal line 113 in the valve 103 and line 108 to the cylinder 109. The control cable 107 will then move the valve body of the valve 103 to the left as viewed in the drawing, whereupon connections 113 and 108 are throttled and connections 113 and 101 to the cylinder 99 are opened. This side of the vehicle is raised by the two wheel systems 105, 111. The vehicle side 87, 94 is then lowered by initially draining pressure medium from the cylinder 93, which is subjected to the lightest load, over line 92 and an internal line 114 in the valve 84 and via a single path valve 115 to the line 62. The control cable 98 will then be actuated to move the valve body of the valve 84 to the left, as seen in the drawing, thereby throttling the line 92 and opening connection 85 to the line 114 to the line 62. If, as a result of signals fed to the signal converting and amplifying device 7, pressure medium is supplied to or drained from the cylinders by actuation of the valve 60, as previously described, and the load is uniformly distributed on one side or the other of the vehicle, the arrangement just described will equalize the unequal load distribution when the weight 74 detects the incorrect inclination of the vehicle.

The embodiment illustrated in FIGS. 3, 4 is conceived to be a constructive solution of the diagrammatically illustrated embodiment of FIG. 2, and like reference numerals have been used to identify like parts. The valves 72 and 79 cooperate with each other in a manner whereby pressure medium enters at 58 and 116 and reaches chambers 117 and 118 via constrictions 119 and 120, before it passes spaces 121 and 122 and enters the valve 72 through the opening 123 and leaves the valve through the opening 124. When the weight moves the valve body of the valve 72 to throttle space 121, a pressure above atmospheric is created in the chamber 117, whereby the valve body is moved until the spaces 121 and 122 are of equal size. The arrangement is thus that the valve bodies of the valves 79 and 72 accompany the movement of each other so that the valve body of the valve 72 becomes the pilot body for the valve 79.

Figure 5:
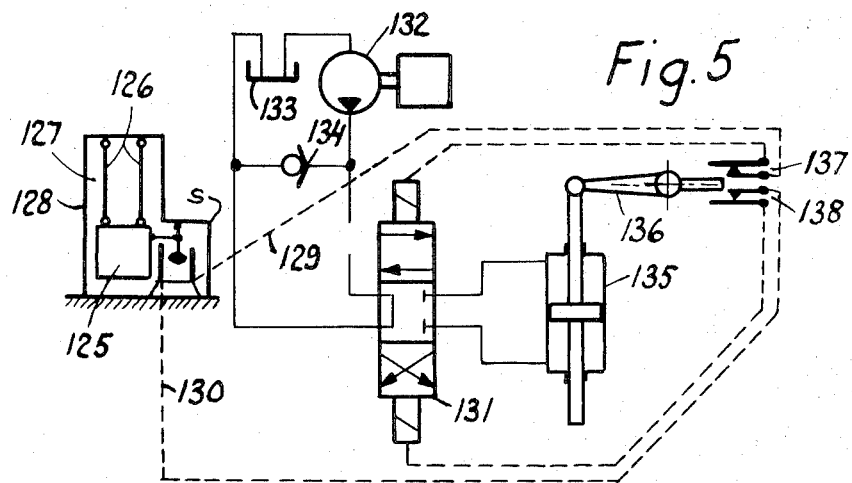
FIG. 5 illustrates an electrohydraulic apparatus according to the invention.

FIG. 5 illustrates a simplified embodiment of the system of the invention which can be used with vehicles with which it is not necessary to maintain the level thereof or to insure uniform distribution of load thereon.

In this embodiment, a weight 125 corresponding to the weight 74 of FIG. 2 is suspended in a housing 128 filled with a damping fluid 127. Lines 129 and 130 passing from the housing 128 are connected via breaker contacts 137 and 138 with a magnetically operated valve 131. Connected to the valve is pressure fluid system comprising a pump 132, a pressure fluid tank 133 and an overflow valve 134. When the weight 125 deviates from a neutral position, contact is made with an electrically energizing means S, whereby electric signals are conducted along lines 129 or 130 to the valve 131. Upon actuation of the valve 131, the pressure medium system is connected to a piston-cylinder device 135, which via a lever mechanism 136, causes the wheel setting, vehicle body attitude or anti-heeling rod setting or the like of the vehicle to be adjusted. The operating movement can be maximized by means of the braker contacts 137 and 138.

In FIG. 5, the cylinder 135 corresponds to, e.g., the cylinder 99 in FIG. 2. FIG. 5 shows a simplified embodiment of the invention, and there is no connection between this embodiment and the embodiment shown in FIG. 1.

The steering wheel 8 has nothing to do with the tilting or height regulation of the vehicle. It is shown just to illustrate that servo steering can be arranged by making very small changes and additions to the tilting and height regulating system of the invention.

FIGS. 1 and 2 show two different embodiments of the wheel systems. In FIG. 1, the wheel systems are shown as bogies, and in FIG. 2, they are shown as single wheels. However, they have the same function in both embodiments.

Cable 49 is a Flex-ball cable which actuates the valve 55 to which the piston-cylinder device 52, 53 is connected.

Turning the steering wheel 8 moves the control cables 49 and 54. This changes the valve 55 to control the piston-cylinder device 52–53 to turn the wheel. Hence, these means have no direct action or control on the body height.

The pulses from the piston 9 by lines 11 and 12 are of a hydraulic liquid, in the embodiment shown in FIG. 1, and they act on a hydraulic piston-cylinder device (not shown) that transmits the pulses to a movement that will directly actuate the weight, but they may also be converted to electric pulses by any suitable known device and act on the solenoid already mentioned to move the weight W.

The solenoid connected to the line 6 could move the pin 73 of the valve 72 directly. However, the basic idea of the invention is to use a weight as a sensing means for the forces acting on the vehicle and to use this weight to control the vehicle tilting system in accordance with the resultant force. The sensing means 1, 2 and 3, the counter 5 and the lines 4 and 6 only give information that supplements the information given by the weight and which sensing means will speed up the action of the weight.

Of course, positive and negative pulses will be sent from the sensing means 1, 2 and 3 to move the solenoid in opposite directions. Thus, positive pulses will actuate the weight in one direction, and negative pulses will actuate the weight in the opposite direction.

While two complete embodiments of the invention have been disclosed herein, it will be appreciated that modification of these two particular embodiments of the invention may be resorted to without departing from the scope of the invention.

What is claimed is:

1. A system for regulating the height of a vehicle body relative to the ground and for tilting said body laterally in relation to the vehicle body supporting means in response to gravitational and inertia forces acting on the vehicle, characterized by a laterally movable weight supported by the vehicle body and arranged to take a neutral position in said body when the body is in the desired attitude and to move from said neutral position when the attitude of said body deviates from the desired attitude as a result of the forces acting therein, and which weight is arranged to actuate a distribution valve when moved from its neutral position so as to distribute pressure medium, responsive to the movement of the weight, to piston-cylinder means adapted to regulate the height of at least one side of the vehicle body in relation to the vehicle body support means, the system also including a height regulating valve which is arranged to be actuated by means which sense the means height of the vehicle above the vehicle supporting surface and which supplies pressure medium to piston-cylinders arrangement to effect lifting or lowering of said vehicle body, and the vehicle being provided with at least one means which attempts to restore the vehicle body to a neutral attitude when said vehicle body takes an inclined attitude relative to the vehicle supporting surface.

2. A system according to claim 1, characterized in that each of the piston-cylinder arrangements have double pistons, which are arranged to serve two vehicle support wheels via a linkage system.

3. A system for regulating the height of a vehicle body relative to the ground and for tilting said body laterally in relation to the vehicle body supporting means in response to gravitational and inertia forces acting on the vehicle, characterized by a laterally movable weight supported by the vehicle body and arranged to take a neutral position in said body when the body is in the desired attitude and to move from said neutral position when the attitude of said body deviates from the desired attitude as a result of the forces acting therein, and which weight is arranged to actuate a distribution pressure medium, responsive to the movement of the weight, to piston-cylinder means adapted to regulate the height of at least one side of the vehicle body in relation to the vehicle body support means, the system also including a height regulating valve which is arranged to be actuated by means which sense the mean height of the vehicle above the vehicle supporting surface and which supplies pressure medium to piston-cylinders arrangement to effect lifting or lowering of said vehicle body, and the vehicle body being tiltable laterally in relation to the vehicle supporting means in a direction against the center of a curve forming a bend when the vehicle moves around such bend.

4. A system according to claim 3, characterized in that equalizing valves are arranged behind the vehicle height regulating valves, which insure that the quantity of pressure medium determined by said valves is passed from the piston-cylinder arrangements independent of the conditions of the load thereon.

5. A system according to claim 3, characterized by means operably connecting to the weight to hasten the movement thereof, and thus also movement of the valve cooperating therewith, with rapid changes in the direction of movement of the vehicle body.

6. A system according to claim 3, characterized in that the weight is arranged to impose load on a pressure medium, by which the valve cooperating with said weight is controlled.

7. A system according to claim 3, characterized in that manually actuated operating means are provided whereby the vehicle can be adjusted to at least two separate mean heights above the vehicle supporting surface.

8. A system according to claim 3 characterized in that a portion of the piston-cylinder means are mechanically connected to support wheels to control the positioning thereof in relation to the body.

9. A system according to claim 4 characterized in that the equalizing valves are an operative portion of a hydraulic system connecting to the height regulating valve, which hydraulic system also connects to the distribution valve and to the piston-cylinder means.

10. A system for regulating the height of a vehicle body relative to the ground and for tilting said body laterally in relation to the vehicle body supporting means in response to gravitational and inertia forces acting on the vehicle, characterized by a laterally movable weight supported by the vehicle body and arranged to take a neutral position in said body when the body is in the desired attitude and to move from said neutral position when the attitude of said body deviates from the desired attitude as a result of the forces acting therein, and which weight is arranged to actuate a distribution valve when moved from its neutral position so as to distribute pressure medium, responsive to the movement of the weight, to piston-cylinder means adapted to regulate the height of at least one side of the vehicle body in relation to the vehicle body support means, the system also including a height regulating valve which is arranged to be actuated by means which sense the mean height of the vehicle above the vehicle supporting surface and which supplies pressure medium to piston-cylinders arrangement to effect lifting or lowering of said vehicle body, and further characterized in that arranged in pressure medium lines passing to the piston-cylinder means is a container which includes pressure-gas cushioning means separate from the pressure medium, said cushioning means giving spring properties to the piston-cylinder arrangement.

11. A system for regulating the height of a vehicle body relative to the ground and for tilting said body laterally in relation to the vehicle body supporting means in response to gravitational and inertia forces acting on the vehicle, characterized by a laterally movable weight supported by the vehicle body and arranged to take a neutral position in said body when the body is in the desired attitude and to move from said neutral position when the attitude of said body deviates from the desired attitude as a result of the forces acting therein, and which weight is arranged to actuate a distribution valve when moved from its neutral position so as to distribute pressure medium, responsive to the movement of the weight, to piston-cylinder means adapted to regulate the height of at least one side of the vehicle body in relation to the vehicle body support means, the system also including wheel system support cylinders supplied by pressure medium from said piston-cylinder means to effect lifting or lowering of sides of said vehicle body, and further characterized in that arranged in pressure medium lines passing to said wheel system support cylinders is a container which includes pressure-gas cushioning means separate from the pressure medium, said cushioning means giving spring properties to the wheel system support cylinders.

12. A system according to claim 11 characterized in that equalizing valves are arranged between the vehicle height regulating valves and the wheel system support cylinders to insure that the quantity of pressure medium determined by said valves is passed to and from such support cylinders independent of the conditions of the load thereon.

13. A system according to claim 12 where individually movable wheel systems are provided adjacent each end of vehicle and on each side thereof and where pressure medium is initially supplied to the wheel system support cylinder for one wheel system at one end of one side of the vehicle, and control means connect such wheel system to one of said equalizing valves to activate the same on movement of said one wheel system and supply pressure medium to the wheel system support cylinder on the same side but opposite end of the vehicle to actuate the same.

14. A system according to claim 13 where a second control means connects between said second wheel system and said first control means to reflect movement of said second wheel system to balance load lift action regardless of load distribution.

* * * * *